United States Patent [19]

Puryear

[11] 4,391,418
[45] Jul. 5, 1983

[54] SILENT, ANTI-REVERSE ACTUATOR MECHANISM

[75] Inventor: John W. Puryear, Tulsa, Okla.

[73] Assignee: Brunswick Corporation, Skokie, Ill.

[21] Appl. No.: 333,118

[22] Filed: Dec. 21, 1981

[51] Int. Cl.³ .............................................. A01K 89/01
[52] U.S. Cl. ................................ 242/84.2 A; 74/576; 188/82.4; 242/84.5 A
[58] Field of Search .................. 242/84.2 A, 84.21 A, 242/84.21 R, 84.2 R, 84.1 R, 84.51 A, 84.5 A, 84.5 R, 84.51 R; 188/82.3, 82.34, 82.4; 74/576

[56] References Cited

U.S. PATENT DOCUMENTS

| | | | |
|---|---|---|---|
| 3,225,874 | 12/1965 | Woolley | 74/576 |
| 3,481,554 | 12/1969 | Hull | 242/84.2 A |
| 3,489,365 | 1/1970 | Hull | 242/84.2 A |
| 3,612,425 | 10/1971 | Shakespeare et al. | 242/84.1 R |
| 4,323,203 | 4/1982 | Neufeld | 245/84.5 A |

FOREIGN PATENT DOCUMENTS 20845 2/1961 German Democratic Rep. ............................... 242/84.5 A Primary Examiner—Billy S. Taylor
Attorney, Agent, or Firm—John G. Heimovics

[57] ABSTRACT

An anti-reverse actuator mechanism having an actuator (50) associated with a center shaft (15) by mounting on a member (20,70,90) rotatable with the center shaft and having parts frictionally engaging said member whereby there is a yieldable drive connection between the member and actuator and with the driving force therebetween being independent of the force of a control spring associated with the center shaft. The actuator is formed of spring wire and has a pair of sections (65,66) in opposed relation for engaging the member and with an arm (67) extending therefrom into engagement with the anti-reverse device.

14 Claims, 7 Drawing Figures

SILENT, ANTI-REVERSE ACTUATOR MECHANISM

TECHNICAL FIELD

This invention relates to a spin cast style fishing reel and, more particularly, to a silent anti-reverse actuator mechanism.

BACKGROUND ART

Exemplary of anti-reverse actuator mechanisms is the structure shown in Hull Pat. No. 3,489,365 wherein an actuator for an anti-reverse device is mounted on the center shaft of the reel and yieldably urged into engagement with a drive gear on the center shaft by a control spring whereby there is a yieldable connection of the actuator to the control shaft. It is also known to position washers at both sides of the actuator. In the prior structures there is a tight or rough feeling while turning the crank handle of the reel, resulting from tight spots caused by normal manufacturing variations in the parts and with the feel greatly magnified by the gear ratio of the reel. After the actuator has moved the anti-reverse device, it no longer rotates with the control shaft and with the force of the control spring required for proper operation of the reel, there is considerable resistance exerted against the actuator which is stationary and acting to resist rotation of the control shaft, thereby causing the reel handle to be hard to turn.

DISCLOSURE OF THE INVENTION

The present invention proposes the use of an anti-reverse actuator associated with the control shaft of the reel and which is yieldably rotatably associated with the control shaft by a force which is independent of the force of the control spring. This is accomplished by having a member fixed to the control shaft having a surface which is compressively engaged by a part of the actuator to provide as much force as is required for movement of the anti-reverse device by the actuator and without being dependent on the force of the control spring required for other operations of the reel.

The present invention further proposes the use of a member keyed to the control shaft having a peripheral surface either provided by a spacer or suitable shaping of a drive gear on the control shaft which provide a gripping surface for compressive engagement by the actuator.

Additionally, the actuator is formed of spring wire with a pair of spaced-apart interconnected legs, at least one having a concavely curved section with said sections being in opposed relation and arranged to compressively engage portions of the surface of the member mounted on the control shaft and with one of said legs having an arm at an end thereof for association with the anti-reverse device.

DESCRIPTION OF THE FISHING REEL STRUCTURE

Figure 1:
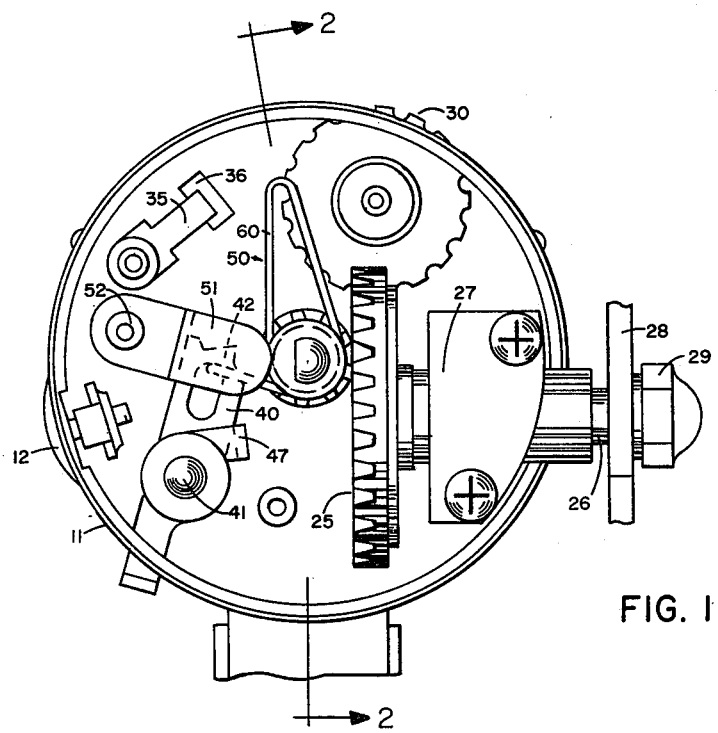
FIG. 1 is a rear elevational view of the reel, with the rear cover removed and with parts broken away.
Figure 2:
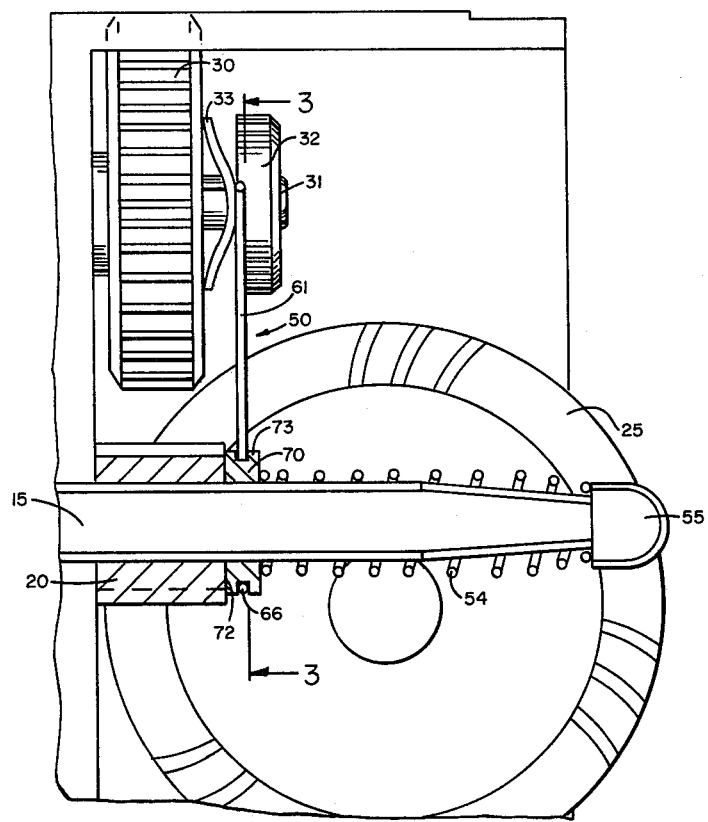
FIG. 2 is a vertical section, taken generally on the line 2—2 in FIG. 1 and on an enlarged scale.
Figure 5:
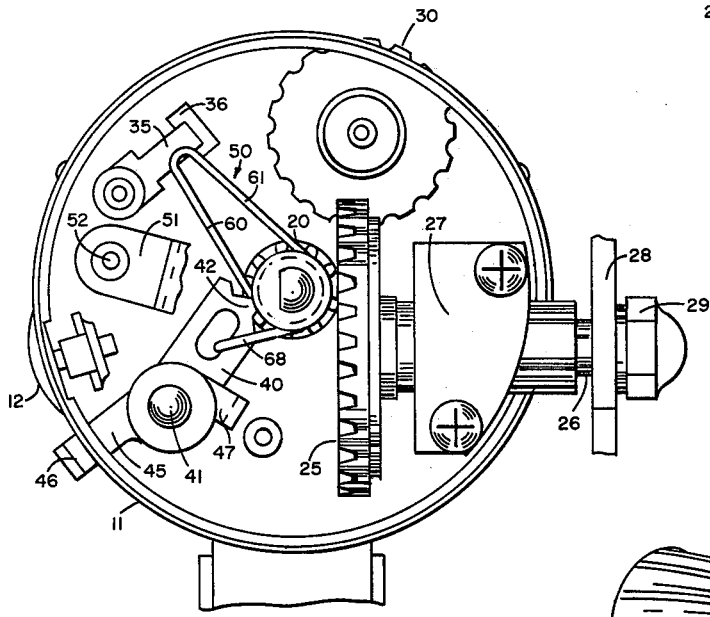
FIG. 5 is a view, similar to FIG. 1, showing the anti-reverse device in another position.

FIGS. 1, 2 and 5 generally depict the structure of a spin cast type fishing reel with respect to which the invention pertains and which utilizes the preferred embodiment of the invention.

The reel has a body assembly 11 formed as a generally cylindrical member for mounting of front and rear covers (not shown). The structure of the reel is shown in FIGS. 1 and 5, with the rear cover removed. An externally operable cover lock 12 has means for locking the rear cover in position, as known in the art.

A center shaft 15 extends lengthwise of the reel and, through the body assembly 11, for causing rotation of a spinner head (not shown) generally in the manner as shown in the aforesaid Hull U.S. Pat. No. 3,489,365.

The center shaft has a drive gear 20 keyed thereto for rotation together and relative longitudinal movement one with respect to the other by an opening 21 in the drive gear correspondingly shaped to the non-cylindrical shape of the center shaft. The drive gear 20 is rotated by a gear 25 mounted on a crankshaft 26 journalled within a mounting formed on the body assembly and retained in position by a cover mounting plate 27. The crankshaft has a crank 28 suitably fixed to its outer end by a nut 29 whereby the crankshaft can be rotated by a user of the reel.

Additionally shown is an adjustable drag mechanism having a thumb wheel 30 for a drag brake and which, by rotation, causes adjustment of a drag brake (not shown) for controlling the drag exerted against rotation of the line spool of the reel. The thumb wheel 30 is mounted for rotation on a member 31 having a head 32 and is urged into a limit position by means of a spring washer 33. A drag brake clicker element 35 in the form of a spring extends through an opening 36 in the body assembly for engagement with serrations on the line spool to give an audible signal when the line spool is rotating.

The anti-reverse device is in the form of a pawl 40 pivotable about a mounting pin 41 extended from the body assembly 11 and which is movable between an inoperative position, shown in FIG. 1, and an operative position, shown in FIG. 5. In the operative position, a tooth 42 on an end of the pawl is engaged between a pair of gear teeth on the drive gear 20 whereby drive gear cannot rotate in a counterclockwise direction, as viewed in FIG. 5.

The anti-reverse pawl 40 is manually positionable in an inactive position by movement of an L-shaped control lever 45 rotatably mounted on the pin 41 and having an extension 46 extending outwardly of the reel body assembly. An angularly-extending end 47 of the control lever 45 is positioned to engage the pawl 40 and positively move the pawl to an inactive position.

The anti-reverse pawl 40 is positionable under the control of an actuator, indicated generally at 50 and which causes positioning of the pawl as a result of rotation of the control shaft 15. A retainer element 51 overlies the anti-reverse pawl 40 and a portion of the actuator to assist in retaining the parts in assembled relation and this retainer is mounted to the body assembly at 52.

A control spring 54 surrounds the rear end of the center shaft 15 and acts between an end of the center shaft and a member which is fixed relative to lengthwise movement of the center shaft in order to yieldably urge the center shaft rearwardly of the reel. The end of the center shaft may have a retention cap 55 fitted thereon.

DESCRIPTION OF THE PREFERRED EMBODIMENTS

Figure 3:
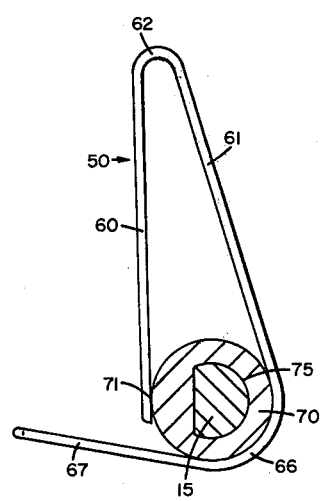
FIG. 3 is a sectional view, taken generally along the line 3—3 in FIG. 2.
Figure 4:
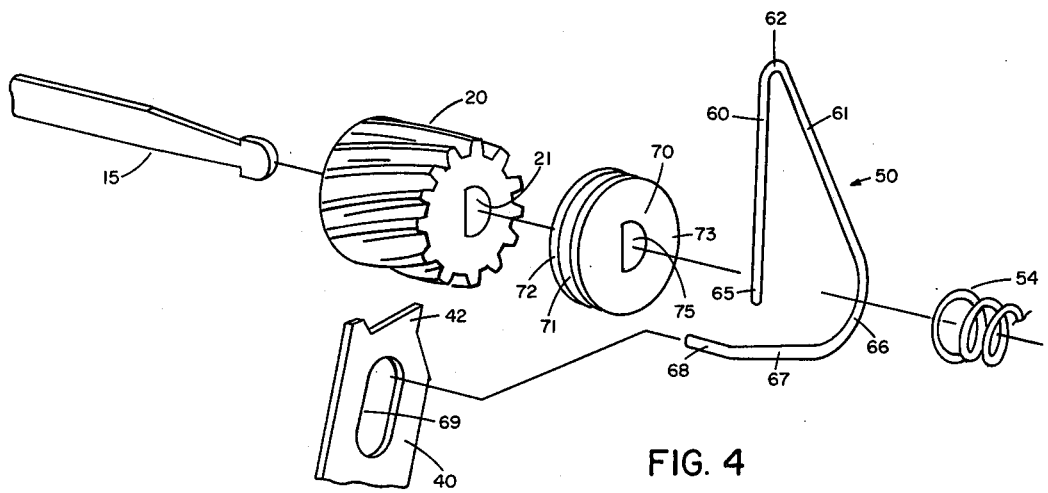
FIG. 4 is an exploded perspective view of components of the anti-reverse actuator mechanism.

Referring to FIGS. 3 and 4, the actuator 50 is formed preferably of spring wire and has a pair of legs 60 and 61 integrally joined at a curved section 62 and which extend in diverging relation relative to each other. The leg 61 has a concavely curved section 66. The concavely curved section 66 is in opposed relation to an end section 65 of the leg 60 for compressively engaging therebetween a member to be described. The leg 61 terminates in an arm 67 having an end 68 at an angle which engages within a slot 69 in the anti-reverse pawl 40.

The member which mounts the actuator, in the embodiment of FIGS. 1-5, is a grooved spacer 70 having an annular groove 71 between a pair of flanges 72 and 73. The spacer is loosely keyed to the center shaft by an opening 75 shaped to fit the contour of the center shaft. As seen in FIG. 2, the flange 72 abuts the drive gear 20 and the control spring 54 abuts the flange 73. The end section 65 of the leg 60 and the concavely curved section 66 of the actuator fit within the groove 71 and are spaced apart a distance slightly less than the diameter of the annular groove whereby the actuator compressively engages the member 70 whereby a yieldable drive connection between the center shaft 15 and the actuator 50 is provided. Rotation of the control shaft 15 in either direction will result in movement of the anti-reverse pawl 40 to a limit position, with further rotation of the center shaft not causing movement of the actuator 50 because of the yieldable drive connection between the actuator and the mounting member for the actuator.

With this construction, the force required for consistent operation of the anti-reverse pawl 40 is completely independent of the force of the control spring 54 which must be in an amount to cause proper operation of the structure of the reel controlled by the longitudinal location of the center shaft.

Figure 6:
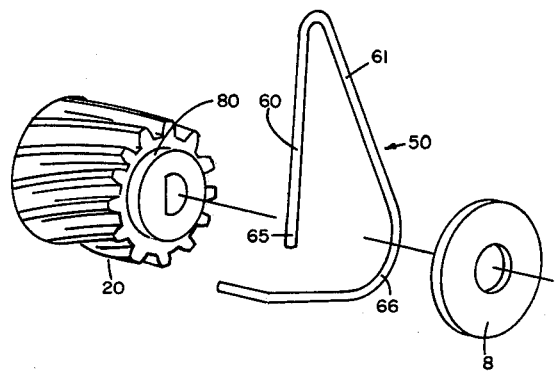
FIG. 6 is a view, similar to FIG. 4, showing a second embodiment of the anti-reverse actuator mechanism.

Another embodiment of structure for mounting the actuator 50 is shown in FIG. 6 wherein the mounting member is actually the drive gear 20 and with the ends of the gear teeth being removed to provide a cylindrical surface 80 onto which the sections 65 and 66 of the actuator may be fitted. The actuator 50 is held in position by a retainer-washer 81 mounted on the center shaft 15, and against which the control spring 54 abuts. This retainer-washer need not be keyed to the center shaft.

Figure 7:
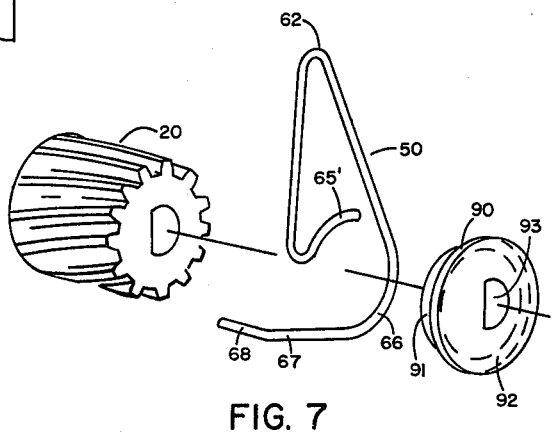
FIG. 7 is a view, similar to FIG. 4, showing a further embodiment of the anti-reverse actuator mechanism.

A further embodiment of the invention is shown in FIG. 7. In this embodiment the actuator has an end section 65 of the leg 60 concavely curved. The mounting member is in the form of a spacer 90 of a T-shape having sections 91 and 92 of differing diameters and with the section 91 of lesser diameter providing a mounting surface onto which the concavely curved sections 65 and 66 of the actuator are mounted. The section 92 of larger diameter holds the actuator in position and provides a reaction surface for the control spring 54. The spacer member 90 has an opening 93 shaped to match the irregular shape of the center shaft 15 whereby the spacer is loosely keyed to the shaft for rotation therewith.

In each of the embodiments shown in FIGS. 4, 6 and 7, the member mounting the actuator, whether being the drive gear 20 or the spacer members 70 and 90 is free to move axially relative to the center shaft 15.

Various materials may be used for the spacer members 70 and 90 to obtain the desired forces. For example, Teflon can be used when very light force is desired, and brass for a medium force, and other suitable material for a higher force.

I claim:

1. In a spin cast type reel having a longitudinally-movable center shaft (15) operable to control operation of the reel and a control spring (54) surrounding said shaft for yieldably holding the center shaft in one position, a selectively-operable anti-reverse device (40), an actuator (50) associated with said center shaft for rotation about the rotation axis of the center shaft for actuating said anti-reverse device in response to rotation of the center shaft, the improvement comprising: means (70,80,90,65,66) for yieldably holding said actuator in rotatable association with said center shaft with a force which is independent of the force of said control spring (54).

2. The spin cast type reel of claim 1 wherein said means comprises parts (65,66) of said actuator in compressive frictional engagement with a surface (71) rotatable with the center shaft.

3. The spin cast type reel of claim 1 wherein said center shaft has a member (20,70,90) rotatable therewith, and said actuator is formed of spring wire with said means comprising parts (65,66) of said actuator which frictionally grip the periphery of said member.

4. In a spin cast type reel having a rotatable center shaft (15) operable to control operation of the reel, a control spring (54) surrounding the shaft for yieldably holding the center shaft in one position, an anti-reverse device (40) to hold said center shaft against rotation in one direction, and an actuator (50) associated with said center shaft for yieldably imparting rotation of the center shaft to said anti-reverse device, a member (20,70,90) fixed to said center shaft for rotation therewith, the improvement wherein said actuator at least partially surrounds and frictionally engages the periphery of said member with a force which is independent of the force of the control spring (54), said actuator having an arm (67) extended into engagement with said anti-reverse device.

5. The spin cast type reel of claim 4 wherein sid member is a gear (20).

6. The spin cast type reel of claim 4 wherein said member is a grooved spacer (70) keyed to said center shaft.

7. The spin cast type reel of claim 4 wherein said member (90) is a T-shape spacer.

8. The spin cast type reel of claim 4 wherein said actuator is formed of spring wire and has a pair of legs (60,61) with one having a concavely curved section (66) to partially surround the periphery of said member therebetween.

9. The spin cast type reel of claim 8 wherein one of said legs has said arm (67) extended therefrom.

10. The spin cast type reel of claim 4 wherein said actuator (50) is formed of spring wire and has a pair of legs (60,61) extended from a curved connecting section (62) in diverging relation, one of said legs terminating in said arm (67) and having an intermediate concavely curved section (66), the other of said legs terminating in a concavely curved section (65) extending in a direction opposite to said arm and in opposed spaced relation to the concavely curved section of said one leg whereby said actuator may be moved laterally into engagement with said member, and the distance between said sections being less than the diameter of said member to compressively engage said member.

11. A spin cast type reel having a longitudinally-movable center shaft (15) operable to control operation of the reel and having a motion-transmitting gear (20) thereon, a control spring (54) surrounding said shaft for yieldably holding the center shaft in one position, a selectively-operable anti-reverse device (40), and an actuator (50) associated with said center shaft for actuating said anti-reverse device in response to rotation of the center shaft, the improvement comprising: a spacer (70,90) keyed to said shaft and positioned between said gear and said control spring, said spacer (90) having a T-shape with sections of two different diameters; the section (92) of larger diameter abutting said control spring and the section (91) of lesser diameter defining an annular exterior surface; said actuator (50) having means (65,66) to frictionally grip said annular exterior surface for maintaining a yieldable drive connection therebetween.

12. The spin cast type reel of claim 11 wherein said spacer (70) has an annular groove (71) defining said annular exterior surface.

13. The spin cast type reel of claim 11 wherein the frictional grip means of the actuator comprises a pair of opposed concavely curved sections (65,66).

14. The spin cast type reel of claim 13 wherein the actuator is formed of spring wire with a pair of spaced-apart legs (60,61) each having one of said concavely curved sections and one of said legs has an arm (67) at an end thereof for engagement with the anti-reverse device.

* * * * *